United States Patent [19]

Dolyny

[11] Patent Number: 4,879,836
[45] Date of Patent: Nov. 14, 1989

[54] RODENT TRAP

[76] Inventor: Stanislaw Dolyny, 802-2nd Street East, Fort Frances, Ontario, Canada, P9A 1N7

[21] Appl. No.: 265,394

[22] Filed: Oct. 31, 1988

[51] Int. Cl.$^4$ .................. A01M 1/12; A01M 23/14
[52] U.S. Cl. .................................... 43/64; 43/65
[58] Field of Search .................. 43/64, 65, 60, 58, 69

[56] References Cited

U.S. PATENT DOCUMENTS

| | | | |
|---|---|---|---|
| 1,018,277 | 2/1912 | Suhre | 43/65 |
| 1,121,583 | 12/1914 | Gage | 43/64 |
| 1,379,685 | 5/1921 | Haege | 43/64 |
| 1,520,557 | 12/1924 | Berg | 43/69 |
| 1,557,558 | 10/1925 | Cherbonnier | 43/69 |
| 1,667,048 | 4/1928 | Rawlings | 43/64 |
| 1,863,768 | 6/1932 | Silva | 43/69 |
| 2,822,639 | 2/1958 | Kelly et al. | 43/69 |
| 2,825,995 | 3/1958 | Snider | 43/69 |
| 3,423,870 | 1/1969 | Kost | 43/69 |
| 4,241,531 | 12/1980 | Nelson et al. | 43/69 |
| 4,610,105 | 9/1986 | Chandler | 43/69 |

FOREIGN PATENT DOCUMENTS 794647  2/1936  France ..................... 43/69
15030  of 1914  United Kingdom ............ 43/69

Primary Examiner—Richard K. Siedel
Assistant Examiner—Carmine Cuda
Attorney, Agent, or Firm—Adrian D. Battison; Stanley G. Ade; Murray E. Thrift

[57] ABSTRACT

A rodent trap, particularly for mice, comprises a substantially closed container which includes a fixed stationary ramp surface extending from a position adjacent the lid of the container downwardly from one side of the container toward an opposed side at which it ends at a position adjacent to but spaced from the side surface. An upper portion of the ramp surface is roughened to give good grip to the rodent while a lower portion of the ramp is smooth to prevent or inhibit the rodent from turning or reversing once it has reached the lower end of the ramp surface. Bait is applied to the lower end of the ramp surface and to the inner surface of the side wall adjacent the end of the ramp surface. The depth of the container is sufficient so that it can receive the ramp while underneath the ramp is a quantity of water the depth of which is sufficient to drown the mouse. An opening in the lid adjacent the upper end of the ramp is of sufficient small size to prevent the entry of unintended larger rodents.

10 Claims, 4 Drawing Sheets

RODENT TRAP

BACKGROUND OF THE INVENTION

This invention relates to a rodent trap of the type including a container into which the rodent is enticed so that it falls into the container where it can be drowned in a suitable quantity of water.

Various devices of this general type have previously been proposed for example in U.S. Pat. Nos. 4,610,105 (Chandler), 3,423,870 (Kost), 4,241,531 (Nelson) and 2,825,995 (Snider). In all of the above devices the rodent is enticed by suitable bait to walk onto a pivotal trap door arrangement so that the rodent by its own weight activates the pivotal movement of the trap door and is dumped into the container to drown.

Devices of this type have a number of disadvantages and have generally been unsuccessful in the marketplace. Firstly the devices include mechanical moving parts which are prone to failure and which are expensive to manufacture. Secondly mice and other rodents tend to congregate around the feed material so that the platform may be prevented from operation by the weight of other rodents. Furthermore the rodents are fleet footed and careful in protecting their footing so that they are reluctant to move onto a precarious position and are able to extricate themselves from a precarious position as the trap door begins to move to the open position.

SUMMARY OF THE INVENTION

It is one object of the present invention, therefore, to provide an improved rodent trap of this general type which avoids the necessity for moving parts and hence is extremely reliable in operation and is simple and inexpensive to manufacture.

According to the invention, therefore, there is provided a trap for rodents comprising a container having a base and side walls extending upwardly from the base to define a receptacle for water, a removable lid on the container arranged to substantially close the container, an opening in the lid sized just to allow passage therethrough of the rodent, a ramp surface and means mounting the ramp surface such that it remains in fixed stationary position relative to the container and extends from said opening in the lid downwardly into the container and across the container to a position adjacent to but spaced from one side wall of the container, the construction and inclination of the ramp being such that a rodent will commence to walk down the ramp but is inhibited from returning up the ramp, the depth of the side walls being sufficient to receive the height of the ramp and to receive a depth of water below the ramp which is sufficient to drown the rodent.

Preferably the ramp surface is roughened at an upper portion adjacent the horizontal platform so the rodent is encouraged to step onto the ramp surface. A lower portion of the ramp surface is then of a smoother nature so that when the rodent reaches the lower portion encouraged by bait on the inner surface of the side wall adjacent the end of the ramp surface it is prevented or inhibited from returning up the ramp surface thus causing the rodent to fall from the ramp into the container for drowning.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
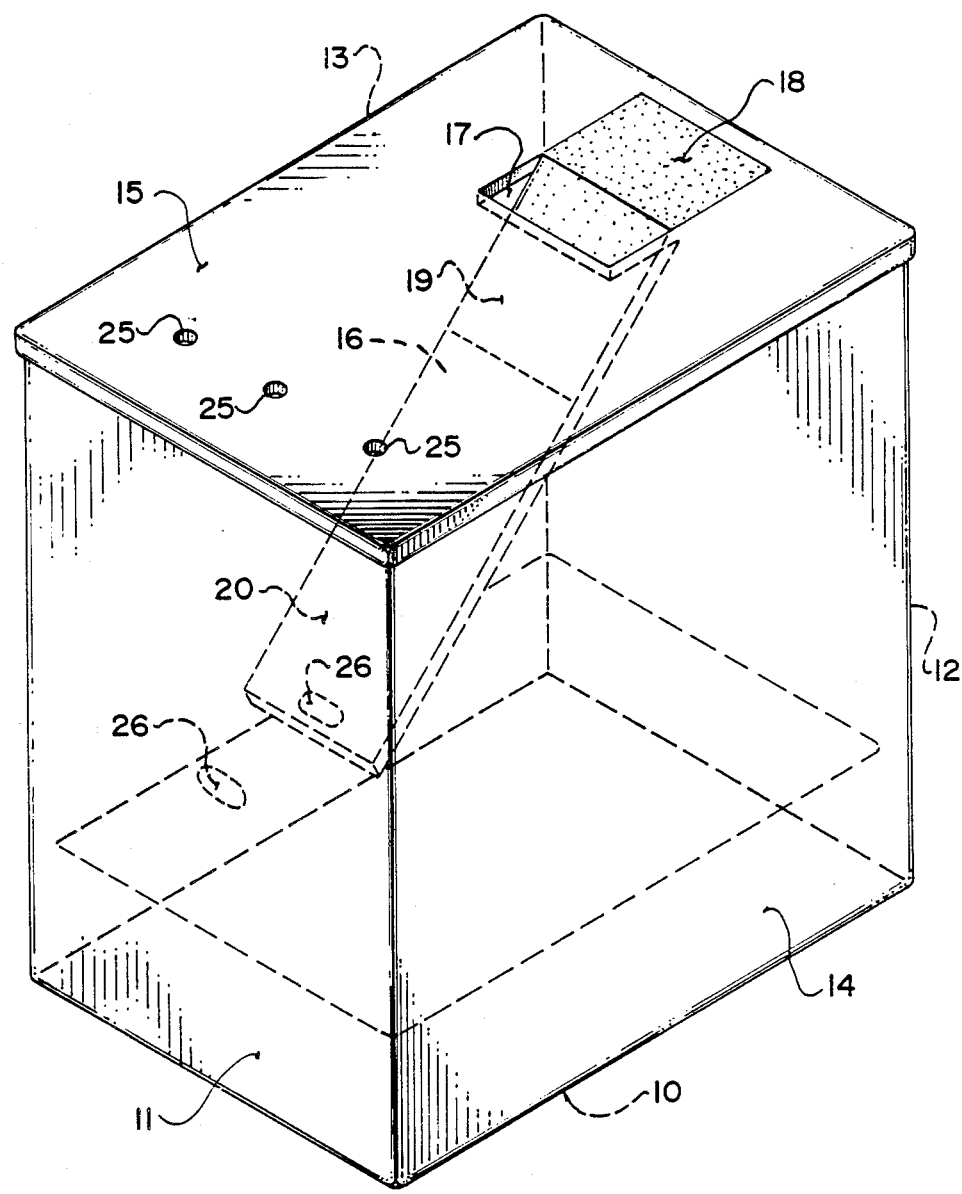
FIG. 1 is an isometric view of a rodent trap according to the invention.

The trap as shown in FIG. 1 comprises a receptacle for water having a base 10 and four upstanding side walls 11, 12, 13 and 14. The receptacle is basically rectangular with vertical side walls. The container includes a lid generally indicated at 15 of a type which can snap into place over a rim at the upper edge of the walls thus forming a substantially closed container.

A ramp surface is formed by an elongate flat strip member indicated generally at 16. In the arrangement of FIG. 1, the strip member is attached to the underside of the lid 15 and extends therefrom downwardly and from a position adjacent one side of the lid to a position adjacent to but spaced from the side wall 11. Adjacent the upper end of the ramp surface is an opening 17 in the lid which allows a rodent to access the upper portion of the ramp surface. A platform portion of the lid indicated at 18 which is contiguous with the upper portion of the ramp surface is roughened so as to provide a good grip of the mouse on the surface so that the mouse is confident to stand and move on the platform surface and around the lid. The roughened surface extends to an upper portion of the ramp surface so the rodent is again confident to step onto the ramp surface and to commence movement along the ramp surface. The roughened portion is indicated at 19.

A lowermost portion of the ramp surface 16 as indicated at 20 is formed with a smooth surface which is of a character to inhibit or prevent the rodent from grasping the surface so that the rodent tends to slip on the surface to the lower end of the ramp surface.

In an example manufactured of wood, the upper rough part can be obtained by applying sandpaper or the like to the upper surface while the lower smooth part can be obtained by paint or varnish applied by dipping of the ramp surface to coat the upper surface and the edges. In a molded plastics ramp, the rough and smooth portions can be obtained by directly molding differential surface characteristics onto the ramp surfaces.

Figure 2:
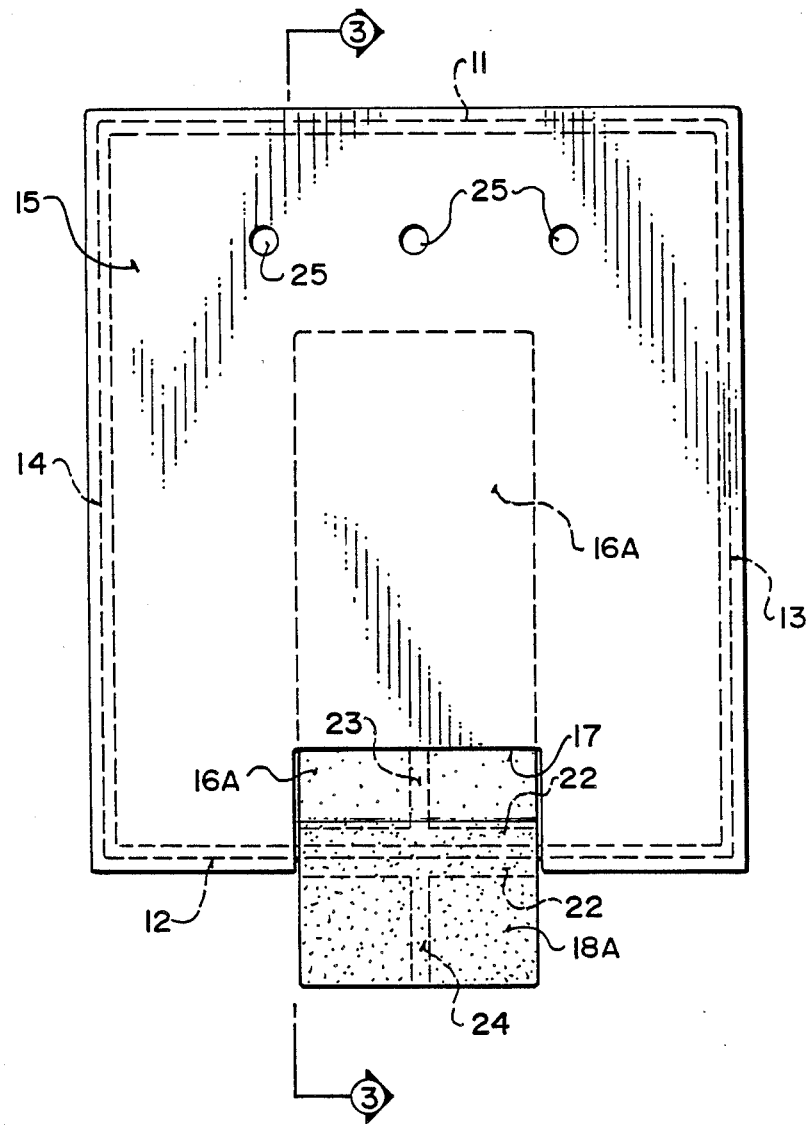
FIG. 2 is a top plan view of a trap according to the invention which is of a slightly modified construction relative to that of FIG. 1.
Figure 3:
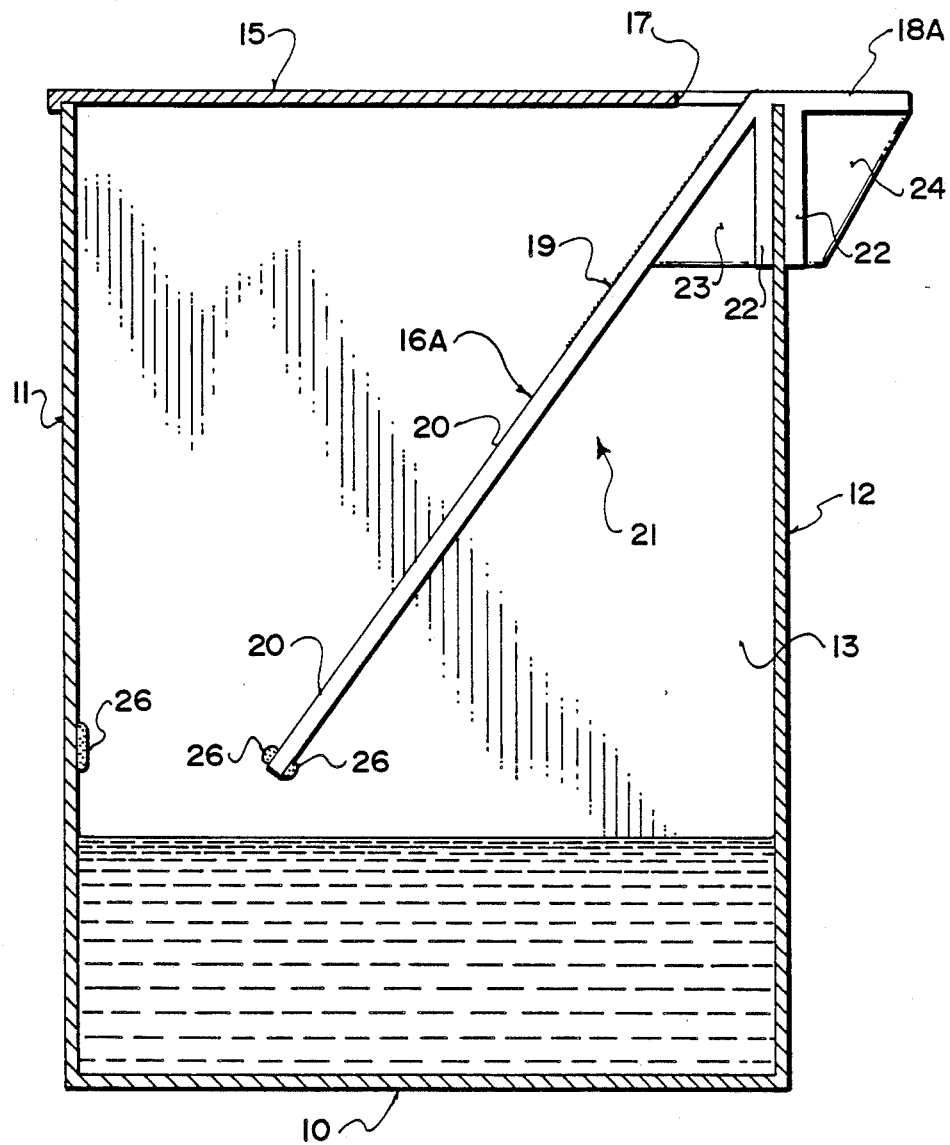
FIG. 3 is a cross-sectional view along the lines 3—3 of the trap as shown in FIG. 2.
Figure 4:
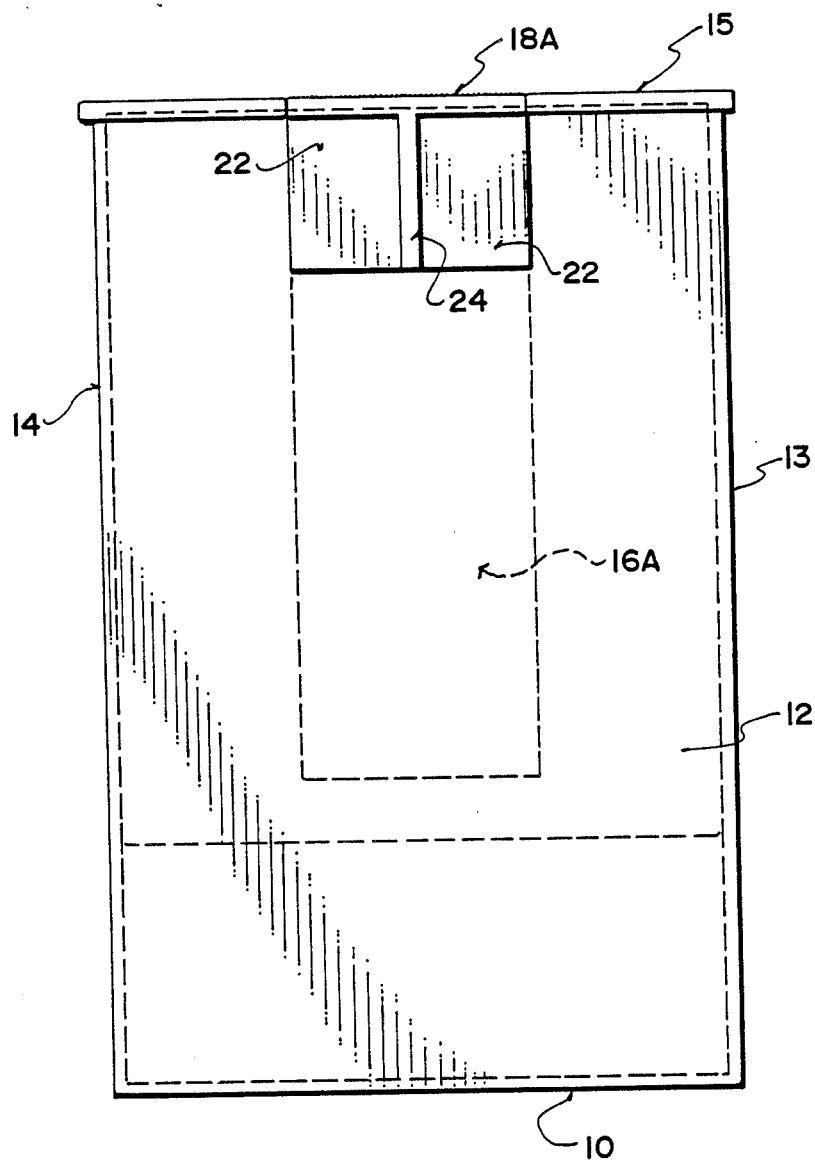
FIG. 4 is a rear elevational view of the trap as shown in FIGS. 2 and 3.

The device shown in FIGS. 2, 3 and 4 is substantially the same as that shown in FIG. 1 but shows a preferred manner of constructing the device. In this case in order to avoid molding problems and possibility of breakage the lid is a separate item from the ramp surface and the ramp surface is formed on a ramp body 21 which includes the ramp surface 16A, a platform 18A and a pair of downwardly depending legs 22 which straddle an upper edge of the side wall 12. Thus the ramp body can be applied to the side wall 12 and can sit over the side wall 12 with the ramp extending into the interior of the container and with the platform 18A extending outwardly to one side of the container. The platform surface and the ramp surface are supported relative to the legs 22 by webs 23 and 24 extending at right angles to the legs 22.

To assist in attracting the rodents, a plurality of small holes 25 can be molded or formed in the cover 15.

In operation the device is sized relative to the rodent which is intended to be trapped, generally mice, so that it is sufficiently large to receive a number of the rodents at the bottom of the container. The container is then filled with water or other liquid which may include antifreeze to allow the device to be used in freezing weather. The container is filled up to a water line which is below the bottom end of the ramp 16 so that the depth of water available below the bottom end of the ramp is sufficient to drown the rodent concerned. In a device suitable for mice, the depth of water would be in the order of 2.5".

The angle of the ramp surface is chosen to be generally of the order of 35° to the vertical which has been found to be sufficiently shallow that the mice can be encouraged to enter onto the ramp surface at the roughened upper portion and yet they are incapable of turning or reversing once they have reached the smooth lower portion 20 on their way down the ramp.

Bait is applied as indicated at 26 to the lower end of the ramp surface and to the inner surface of the side wall 11 at the position aligned with the end of the ramp surface. The distance between the end of the ramp surface and the inner surface of the side wall 11 is chosen so that the rodent cannot reach the side wall without stretching or leaning out from the end of the ramp surface toward the side wall. In an example of the device used for mice, this distance would be of the order of 1.5 inches with the transverse dimension of the container being of the order of 6.75 inches. This leads to a total height of the container of the order of 9.25 inches with the length of the ramp surface being of the order of 8.0 inches.

A suitable bait is one which can be applied to the surfaces and remain stuck to the surfaces readily but can be subsequently cleaned to ensure that the container is retained in a hygenic condition which is attractive to the rodents.

The rodents attracted by the bait, smell of which escapes through the opening 25 and 17 tend to congregate on the lid and the platform portion 18. The opening 17 is sized so that it can just receive one of the rodents concerned thus keeping out any larger rodents which could otherwise take the bait and escape from the container merely by stepping out of the water. In the example shown for mice, the width of the opening from the upper edge of the ramp in a direction away from the ramp would be of the order of 0.5 inches which is sufficient to allow the entry of the mouse without any difficulty but is sufficiently small to prevent the entry of larger rodents such as chipmunks.

It has been observed that the mice once they enter onto the ramp surface, encouraged by the good footing available at the roughend upper end, climb down to the bait while facing the bait and then try to reverse away from the bait by grasping the edges of the ramp surface. This is prevented by the smooth surface so that the mouse cannot reverse or turn and tends to fall from the ramp surface into the water to drown as shown. In addition further mice coming down the ramp following the first mouse tend to push the first mouse from the end of the ramp in their haste to reach the bait.

An example of suitable bait is peanut butter which has particularly attractive odor to the rodents and in addition can be readily applied in a blob of the material which remains in place on the surface to which it is applied, remains attractive to the rodents for a significant period of time and can be readily cleaned when stale.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A trap for rodents comprising a container having a base and side walls extending upwardly from the base to define a receptacle for water, a removable lid on the container arranged to substantially close the container, the lid defining a horizontal top platform for the container which constitutes the upper most surface of the trap, means defining an opening through the platform arranged adjacent one side wall and having a size which is a small portion of the platform and just to allow passage therethrough of the rodent, an elongate, straight continuous ramp surface and means mounting the ramp surface such that is remains in fixed stationary position relative to the container and extends from an upper end of a side of said opening adjacent said one side wall downwardly into the container, under the platform and across the container to a lower end at a position adjacent to but spaced from a side wall opposite to said one side wall of the container, the construction and inclination of the ramp being such that a rodent will commence to walk down the ramp but is inhibited from returning up the ramp, the depth o the side walls being sufficient to receive the height of the ramp and to receive a depth of water below the ramp which is sufficient to drown the rodent, a portion of the ramp surface adjacent the platform and a portion of the platform having a surface characteristic which is rougher than a portion of the ramp surface adjacent a lower end thereof.

2. The invention according to claim 1 wherein the opening is sufficiently small relative to the height of the side walls that any rodent which can pass through the opening can be drowned in the depth of water below the ramp.

3. The invention according to claim 1 wherein the lower end of the ramp terminates at a position spaced from said opposite side wall by a distance such that the rodent cannot reach said opposite side wall from said ramp without stretching out from the lower end of the ramp.

4. The invention according to claim 1 wherein the ramp surface comprises an upper surface of a ramp member, said ramp member including means for releasably mounting the ramp member on said one side wall with said ramp surface extending therefrom.

5. The invention according to claim 4 wherein said mounting means comprises a saddle portion having a pair of downwardly depending legs for engaging inner and outer surfaces respectively of said one side wall.

6. The invention according to claim 1 wherein the lid includes a plurality of small holes.

7. The invention according to claim 1 wherein the ramp surface includes a platform surface contiguous with an upper end of the ramp surface and extending therefrom in a substantially horizontal direction, the platform surface lying in a plane approximately the same height as an upper surface of the lid.

8. The invention according to claim 1 including bait material applied to a lower end of the ramp surface and to an inner surface of said opposite side wall adjacent said lower end of said ramp surface.

9. The invention according to claim 1 wherein the ramp surface is arranged at an angle to the vertical of the order of 35°.

10. A trap for rodents comprising a container having a base and side walls extending upwardly from the base to define a receptacle for water, a removable lid on the container arranged to substantially close the container, the lid defining a horizontal top platform or the container which constitutes the uppermost surface of the trap, means defining an opening through the platform arranged adjacent one side wall and having a size which is a small portion of the platform and just to allow passage therethrough of the rodent, an elongate, straight continuous ramp surface and means mounting the ramp surface such that it remains in fixed stationary position relative to the container and extends from an upper end of a side of said opening adjacent said one side wall downwardly into the container, under the platform and across the container to a lower end at a position adjacent to but spaced from a side wall opposite to said one side wall of the container, the construction and inclination of the ramp being such that a rodent will commence to walk down the ramp but is inhibited from returning up the ramp, the depth of the side walls being sufficient to receive the height of the ramp and to receive a depth of water below the ramp which is sufficient to drown the rodent, a portion of the ramp surface adjacent the platform and a portion of he platform having a surface characteristic which is rougher than a portion of the ramp surface adjacent a lower end thereof, said ramp surface and a portion of said platform being formed separately from the lid so as to be removable therefrom, the ramp surface and the portion of the platform including a pair of downwardly extending legs for engaging inner and outer surfaces respectively of said one side wall.

* * * * *